Patented June 13, 1944

2,351,157

UNITED STATES PATENT OFFICE 2,351,157

PURIFICATION OF NITRILES

Waldo L. Semon, Silver Lake, Ohio, assignor to The B. F. Goodrich Company, New York, N. Y., a corporation of New York No Drawing. Application October 30, 1943, Serial No. 508,395

3 Claims. (Cl. 202—42)

This invention relates to the purification of nitriles particularly low-molecular weight aliphatic unsaturated nitriles such as acrylonitrile and has as its object the provision of an economical and efficient process for obtaining nitriles of an extremely high degree of purity.

Acrylonitrile and other low-molecular weight unsaturated nitriles are often prepared commercially by reactions involving hydrogen cyanide and, as a result, the commercial grades of such nitriles frequently contain small amounts of this material as an impurity. While for many purposes the presence of traces of residual cyanide is not particularly objectionable, in instances where the nitrile is employed in polymerization processes it is of great importance that the nitrile be of the highest degree of chemical purity because of the fact that even small amounts of impurities often complicate the polymerization processes. However, it has heretofore been difficult to purify such nitriles to the required high degree of purity except by the use of expensive and elaborate purification processes.

I have now discovered that acrylonitrile of an extremely high degree of chemical purity may be obtained from impure acrylonitrile containing small amounts of hydrogen cyanide by treating the impure acrylonitrile with an aqueous suspension of a freshly precipitated heavy metal hydroxide and then distilling off the nitrile in the form of an azeotropic mixture with water.

As examples of heavy metal hydroxides which may be used in this process there may be mentioned the hydroxides of such heavy metals as copper, silver, mercury, zinc, cadmium, chromium, manganese, iron, cobalt, nickel and other heavy metals, the hydroxides of the heavy metals enumerated and of others also occurring in the 6th to 12th positions of the long periods, particularly the first long period, of Thomsen's periodic table (wherein the elements are arranged in short and long periods, the alkali metals occupying the first position) being preferred. Freshly precipitated cupric hydroxide, ferrous hydroxide and mercuric hydroxide have been found especially suitable. Aqueous suspensions of such freshly precipitated hydroxides may be prepared by mixing an alkali such as sodium hydroxide with an aqueous solution of a water-soluble heavy metal salt.

As an example of the method of this invention, 100 parts of impure acrylonitrile prepared either by catalytic dehydration of ethylene cyanhydrin, by pyrolysis of cyanethyl acetate or by direct addition of hydrogen cyanide and acetylene, which impure acrylonitrile possesses a strong odor of hydrogen cyanide and does not boil over a narrow range, is mixed with about 40 parts (an amount such that the cupric hydroxide is in slight chemical excess of the hydrogen cyanide present in the nitrile) of a light blue aqueous suspension of cupric hydroxide prepared by mixing 25 parts of cupric sulfate and 7.2 parts (a slight chemical excess) of sodium hydroxide each in 200 parts of water. The mixture of the impure acrylonitrile and the cupric hydroxide suspension is stirred vigorously for a few minutes and the mixture is then distilled. A small fraction of low-boiling material is first distilled but then a fraction representing substantially all of the acrylonitrile in the impure sample distills as an azeotrope with water at a constant boiling point of 68–68.5°. This fraction separates into two layers, the upper layer consisting of moist acrylonitrile which is dried or redistilled to yield anhydrous acrylonitrile boiling at 78–78.5° C. The water layers may be added to the next batch of impure acrylonitrile to be purified. The acrylonitrile so purified is fragrant, possessing none of the bad odors of the original sample, and is found by other appropriate physical and chemical examination to consist of extremely pure acrylonitrile. This acrylonitrile is well suited for use in polymerization processes since it is free from traces of impurities which are harmful to such processes.

The fact that this method of purification is capable of yielding acrylonitrile of such extremely high purity is quite surprising inasmuch as similar processes carried out with cupric sulfate solution or sodium hydroxide solution instead of with freshly precipitated cupric hydroxide suspension do not effect a noticeable improvement in the purity of the acrylonitrile.

Although the above example illustrates a preferred embodiment of the invention, the invention is by no means limited thereto either in materials used or in manipulative steps employed. For example, aqueous suspensions of any freshly-precipitated heavy metal hydroxide of any desired concentration and prepared by any desired reaction may be employed. Again, instead of impure acrylonitrile, other similar low-molecular weight unsaturated aliphatic nitriles such as methacrylonitrile, ethacrylonitrile, alpha-chloroacrylonitrile, crotonic nitrile, itaconic nitrile and the like which are contaminated with small amounts of hydrogen cyanide may also be purified by this method. Saturated aliphatic nitriles such as acetonitrile, butyronitrile, sebacic acid dinitrile and fatty acid nitriles such as the nitriles of palmitic and oleic acids and, in short, any other nitrile of an aliphatic carboxylic acid may also be purified from hydrogen cyanide by treatment with freshly precipitated heavy metal hydroxide suspensions. However, since such saturated nitriles are not often used in polymerization processes, the invention is ordinarily used with the low-molecular weight unsaturated aliphatic nitriles, particularly the nitriles of terminally unsaturated monocarboxylic acids containing less than about eight carbon atoms.

The precise method of treatment of the nitrile with the suspension, and of the subsequent distillation of the purified nitrile may also of course be varied widely. If the nitrile is soluble or moderately soluble in water, simply mixing the nitrile with the suspension and then distilling as in the example is ordinarily the most convenient method. However, if the nitrile is water-insoluble, extraction or scrubbing of the nitrile with the suspension, followed by separation of the nitrile from the aqueous layer and then distillation of the nitrile will generally be the process employed.

Various other variations and modifications of the invention will be apparent to those skilled in the art and are within the spirit and scope of the invention as defined in the appended claims.

I claim:

1. The method of purifying aliphatic nitriles to remove hydrogen cyanide therefrom which comprises treating the impure nitrile with an aqueous suspension of a freshly precipitated heavy metal hydroxide, and then distilling the so treated nitrile.

2. The method of purifying low-molecular weight aliphatic unsaturated nitriles containing small amounts of hydrogen cyanide impurity which comprises treating the impure nitrile with an aqueous suspension of fresly precipitated cupric hydroxide and then distilling the so-treated nitrile.

3. The method of purifying impure acrylonitrile containing a small amount of hydrogen cyanide impurity which comprises treating the acrylonitrile with an aqueous suspension of freshly precipitated cupric hydroxide, distilling the product to yield an azeotropic mixture of pure acrylonitrile and water and separating pure acrylonitrile from the azeotropic mixture.

WALDO L. SEMON.